United States Patent [19]

LoBiondo et al.

[11] Patent Number: 4,660,253

[45] Date of Patent: Apr. 28, 1987

[54] APPARATUS FOR MACERATION OF MEAT

[75] Inventors: Salvatore J. LoBiondo, West Caldwell; Joseph V. LoBiondo, Bloomfield, both of N.J.

[73] Assignee: Senza Gel Corporation, Newark, N.J.

[21] Appl. No.: 590,710

[22] Filed: Mar. 19, 1984

[51] Int. Cl.$^4$ .............................................. A22C 7/00
[52] U.S. Cl. ........................................................ 17/26
[58] Field of Search .................. 17/26, 25, 27, 28, 29, 17/31

[56] References Cited

U.S. PATENT DOCUMENTS

| | | | |
|---|---|---|---|
| 114,396 | 5/1871 | Bond | 17/26 |
| 252,743 | 1/1882 | Davis | 17/26 X |
| 703,384 | 2/1954 | Spang | |
| 1,986,075 | 1/1935 | Spang | 17/26 |
| 2,025,505 | 12/1935 | Gonser | 17/26 |
| 2,737,684 | 3/1956 | Spang | 17/26 |
| 3,893,384 | 7/1975 | LoBiondo | |
| 4,207,244 | 6/1981 | LoBiondo | |
| 4,242,774 | 1/1981 | Massaro | 17/28 |
| 4,254,533 | 3/1981 | LoBiondo et al. | 17/27 |
| 4,453,288 | 6/1984 | LoBiondo | |

*Primary Examiner*—Willie G. Abercrombie
*Attorney, Agent, or Firm*—Flehr, Hohbach, Test, Albritton and Herbert

[57] ABSTRACT

An apparatus is provided for macerating meat to effect deep penetration of the meat at multiple muscle height levels for improved absorption of curing agents and improved bonding of multiple pieces of meat. The method involves feeding the meat into a compression zone where it is compressed and simultaneously engaged with multi-level maceration means which penetrate and tear the meat at two or more muscle height levels below the surface of the meat; continuously feeding the meat through the compression zone; continuously compressing and macerating the meat at multiple muscle height levels; and expelling the meat from the compression zone to allow the meat to expand to its previous dimensions so that multi-level macerated surfaces are available for bonding of the meat. The apparatus includes a macerating unit or assembly in the form of a plurality of radially slotted discs mounted on a rotatable shaft including at least a first group of such discs in combination with a second group of radially slotted discs having a diameter less than the diameter of said first group and spaced between said first discs. The macerating assembly in combination with a meat macerating apparatus is used to carry out the method of the invention. The macerated meat product produced by the method has a surface containing deeply penetrating ruptures, tears and serrations extending into two or more muscle height levels at varying depths below the surface of the meat.

9 Claims, 14 Drawing Figures

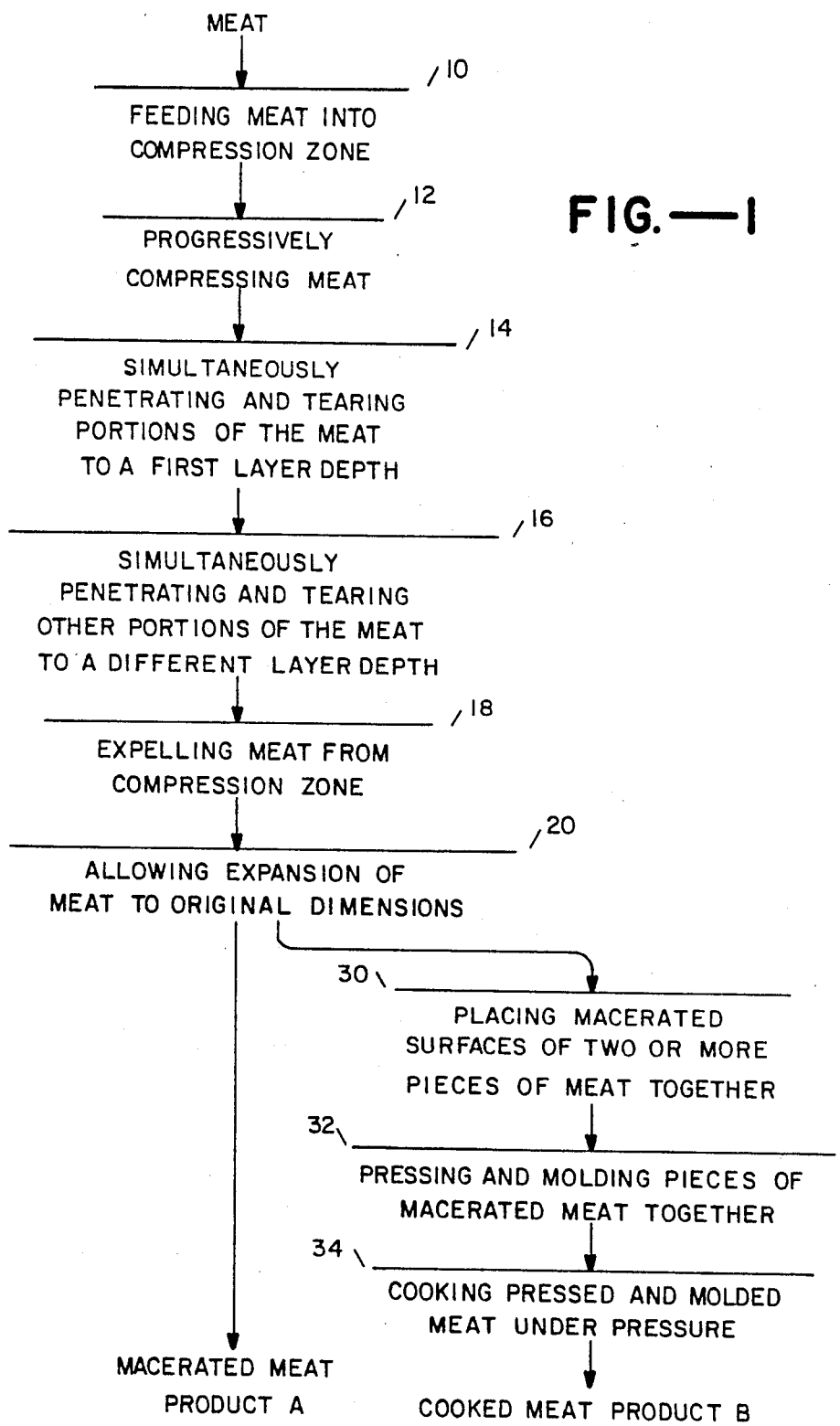

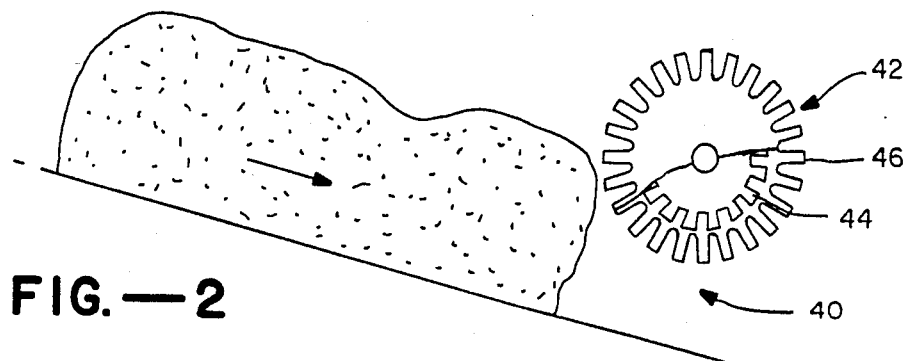
FIG.—2
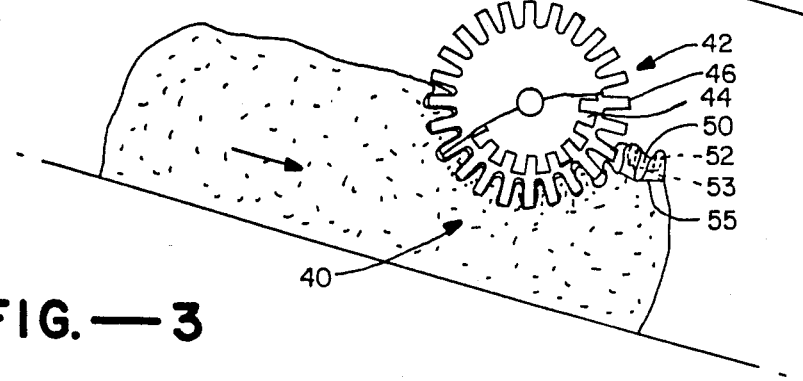
FIG.—3
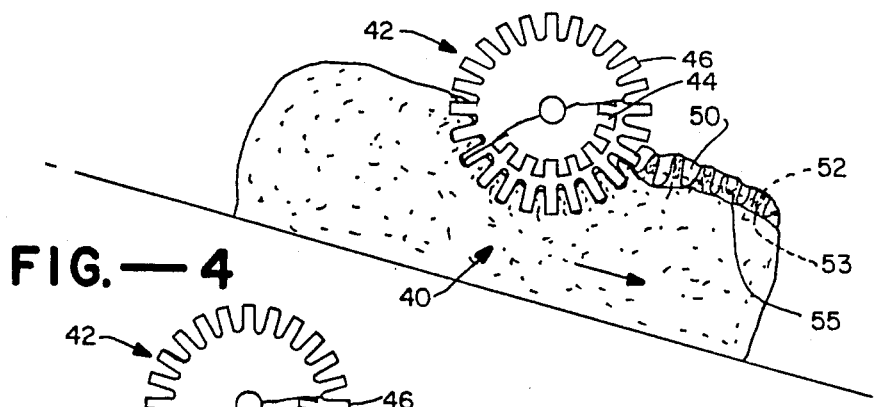
FIG.—4
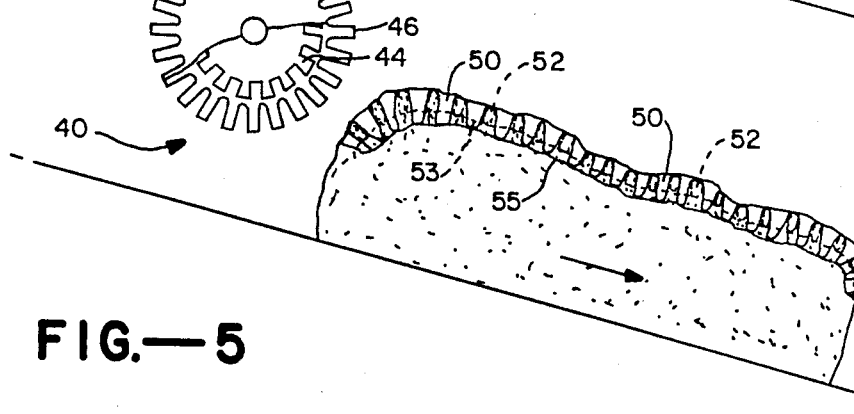
FIG.—5

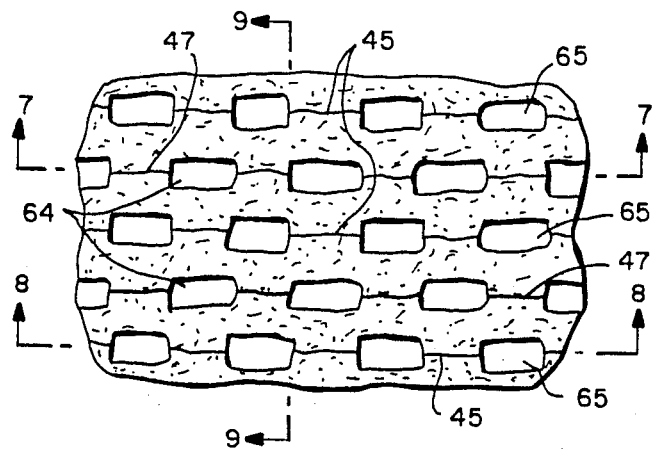
FIG.—6
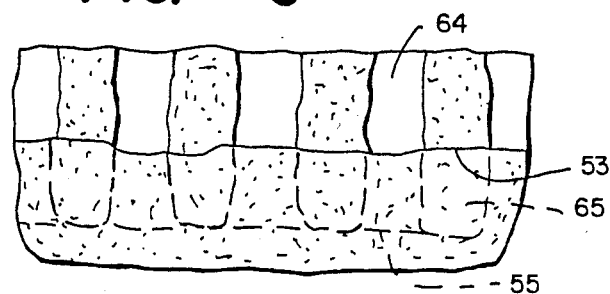
FIG.—7
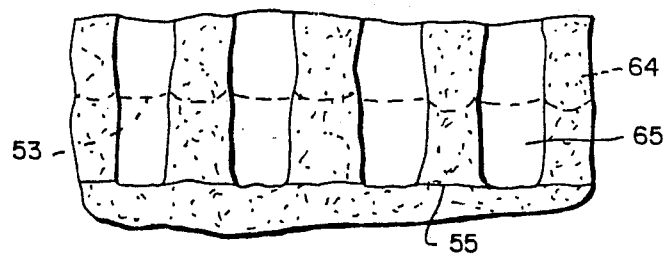
FIG.—8
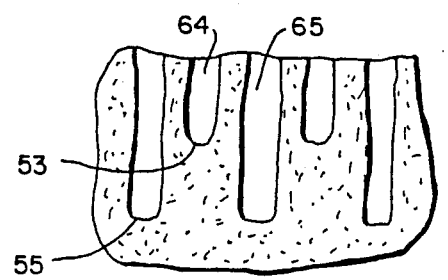
FIG.—9

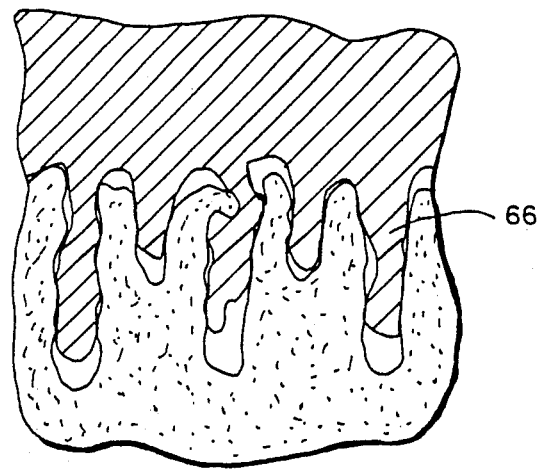
FIG.—10
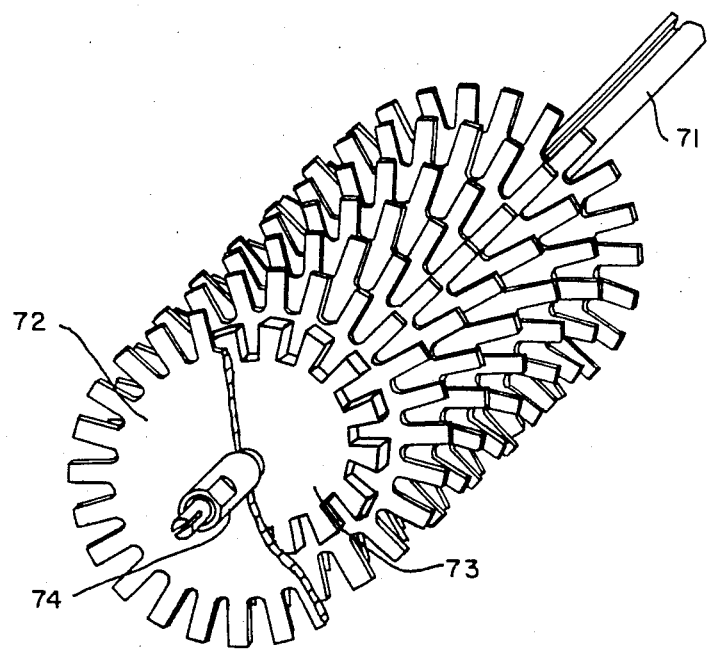
FIG.—11

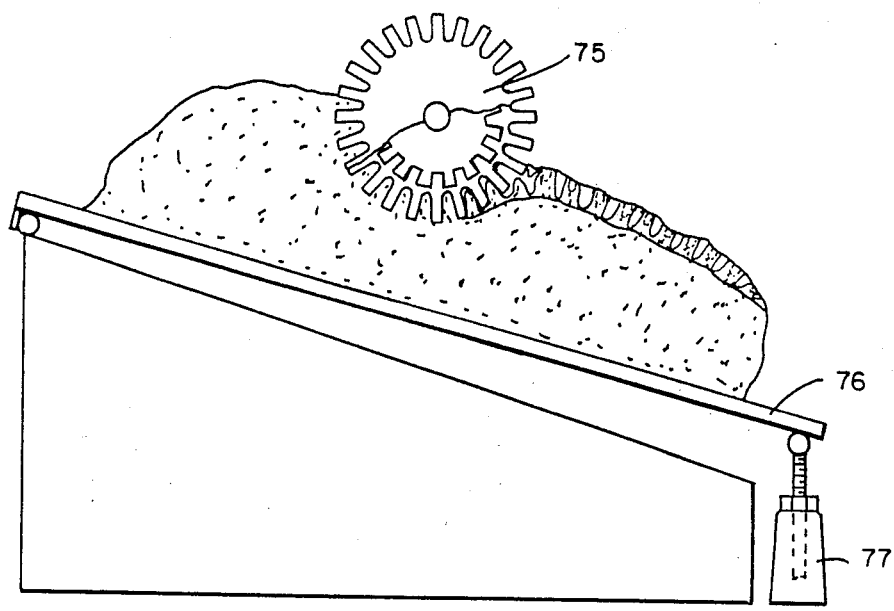
FIG.—12
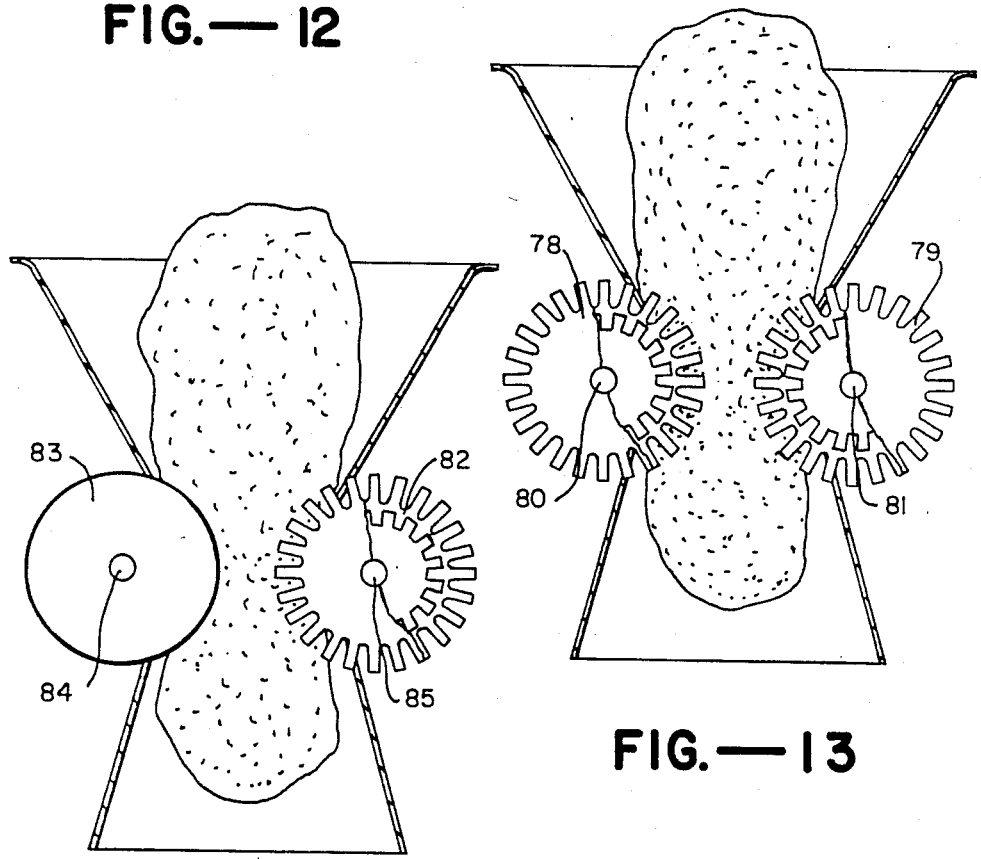
FIG.—13
FIG.—14

APPARATUS FOR MACERATION OF MEAT

The present invention relates generally to a method and apparatus for macerating meat at multiple muscle height levels to achieve improved absorption of curing agents and improved bonding of two or more pieces of meat. Specifically, the invention relates to a method and to a system of apparatus for maceration of meat by tearing, slitting, and rupturing the protein fiber tissue at different muscle height levels, as achieved by an improved macerating unit characterized by a plurality of blunt edged radially slotted discs of differing diameters mounted on a rotating shaft. The present invention is also directed to the product produced by the multi-level maceration method.

Meat, whether it be poultry, pork or beef, can be macerated, by rupturing or tearing the protein fiber tissue, for the purpose of releasing myosin, actin and tropomyosin proteins. The release of these proteins by maceration is desired in the bonding process whereby pieces of macerated meat can be physically pressed together and then molded and cooked under pressure, for example, as disclosed in our U.S. Pat. No. 3,644,125 (issued Feb. 22, 1972). Due to the release of proteins by maceration, the meat pieces can be joined together with a cohesion and binding strength which is very close to that of the uncut meat cells in a whole piece of the same meat. A high degree of cohesion and bind is desired in order to create a denser meat product which has the appearance of a single piece of meat and will remain firmly bonded together when sliced.

Meat is also macerated to allow for more complete and rapid curing. Maceration of the meat aids the curing process by increasing the surface area of the meat, thus allowing the curing agents to more thoroughly and rapidly penetrate the meat. Maceration also allows the curing agent to penetrate deeply into the innermost portions of the meat. The more thoroughly the curing agents penetrate, the better the preservative or stabilizing effect of the curing process on the protein. Without such curing, the protein may soon deteriorate and become unusable and unpalatable. Meat is also slit, ruptured or torn to produce, for example, cube steak, or to tenderize pieces of meat.

Known devices for slitting or macerating meat include rotary knives or blades mounted on a common shaft above a meat-supporting table, along which pieces of meat are slid beneath the rotating knives or blades for maceration. Other devices include a pair of opposing rotary blade shafts through which the meat passes and is thereby macerated on both sides. However, these known devices are not capable of macerating more than one level of muscle tissue.

The multi-level maceration accomplished by the present invention is a new concept which provides for penetration and tearing at two or more levels of muscle tissue. This multi-level maceration allows for a much greater release of myosin, actin and tropomyosin protein than the known methods or machines can accomplish. Thus, the degree of bonding and cohesion between multiple pieces of the multi-level macerated meats greatly increased, producing a much denser and cohesive meat product. Consequently, the meat has the appearance and texture of a whole piece of meat making it more palatable and less likely to break into pieces when sliced than meat produced by the known methods and machines. Furthermore, the present invention allows for much more thorough penetration of the curing agents than the known methods or devices, because the mult-level penetration of muscle tissue increases the amount of surface area which is exposed to the curing agents.

It is therefore an object of the present invention to provide an improvement over known macerating methods and machines by providing for simultaneous maceration of different muscle height levels found in meat to achieve faster and more complete maceration of the meat.

Another object of the present invention is to provide a multi-level maceration method which will improve the cohesion and binding of macerated pieces of meat which have been pressed together and cooked under pressure, by rupturing and tearing more protein fiber tissue faster thereby releasing more myosin, actin and tropomyosin protein.

Another object of the present invention is to provide a multi-level maceration method which will improve the curing process of meats by exposing more protein fiber tissue surface area to the curing agents enabling deeper and more complete penetration by the curing agents.

It is a further object of the present invention to reduce energy usage in cooking or smoking by providing a multi-level maceration method which will expose more surface area of the meat causing increased pickle distribution and increased reabsorption and retention of myosin protein resulting in a denser product which will cook and smoke faster. Energy costs will also be reduced because the increased degree of maceration will reduce the tumbling, massaging or mixing time usually required in the preparation of cured or smoked meat.

A further object of the present invention is to provide a multilevel maceration method which will produce a meat product which is more pliable, resulting in better conforming in the pressing process and the reduction of voids in the final meat product.

It is another object of the present invention to provide an improved system of apparatus for accomplishing the multi-level maceration method, including an improved multi-level maceration unit.

It is a further object of the present invention to provide a denser, more cohesive and more palatable meat product that has the appearance of one piece of meat after the macerated meat pieces have been pressed and bonded together.

In general, the present invention consists of an improved method and apparatus for macerating meat to effect deep penetration and tearing of the meat at multiple muscle height levels to improve and increase absorption of curing agents and the degree of bonding and cohesion between multiple pieces of meat. The method involves feeding the meat into a compression zone, continuously and progressively compressing the meat, simultaneously penetrating and tearing the meat at two or more muscle height levels while it is compressed and fed through the compression zone, and expelling the meat from the compression zone allowing it to expand to its previous dimensions before it undergoes further treatment, such as exposure to curing agents or bonding.

Preferably, the multi-level penetration and tearing is accomplished by means of a multi-level maceration unit or assembly according to the present invention, which consists of a plurality of blunt edged radially slotted discs of differing diameters mounted on a rotating shaft.

The present invention also contemplates a meat macerating apparatus which includes such macerating assembly and the macerated meat product resulting from the new multi-level maceration method.

Additional objects and features of the invention will be evident from the following description taken in conjunction with the accompanying drawings.

FIG. 1 is a flow sheet illustrating the steps in the method of the present invention.

FIGS. 2-5 are schematic views in cross section of the meat as it progresses through the steps in the method of the invention, and of the macerating assembly of the invention as it is employed in the method.

FIG. 6 is a schematic view in plan of the meat product produced by the method of the invention.

FIGS. 7-9 are schematic views in cross section of the meat product produced by the method of the invention.

FIG. 10 is a schematic view in cross section, representative of the manner in which two pieces of meat which have been macerated according to the method of the invention would be bonded together in the pressing and cooking process.

FIG. 11 is an illustration of one preferred embodiment of a macerating unit or assembly according to the present invention.

FIGS. 12, 13, and 14 represent such macerating assembly in combination with differing embodiments of meat macerating machines according to the present invention.

Referring to FIG. 1, the method for macerating meat at multiple muscle height levels is illustrated. The piece of meat to be macerated is fed into a compression zone in step 10. The meat is compressed in the compression zone, step 12, and simultaneously engaged by a multi-level maceration means which deeply penetrates one level of muscle tissue below the surface of a portion of the meat, step 14. Another portion of the meat is simultaneously engaged and penetrated by the multi-level maceration means at a different muscle tissue level in step 16. Throughout steps 12, 14, and 16 the meat is being fed through the compression zone causing the meat to be torn and ruptured at differing points and depths of penetration by the multi-level maceration means. As the meat is fed through the compression zone it is continuously and progressively compressed, penetrated and torn until it is expelled from the compression zone in step 18. In step 20, after the meat is expelled, it is allowed to expand to its previous dimensions resulting in macerated meat product A. The penetrations and tears which occurred while the meat was compressed become deeper as the meat expands and extend far into the interior of the meat at different muscle height levels. While the method diagrammed in FIG. 1 relates to penetration and tearing of the meat at at least two different muscle height levels, the broad method includes the simultaneous penetration of the meat at three or even more muscle height levels. As noted hereinafter, the method of the present invention also contemplates further processing where two or more exterior surfaces of the meat are simultaneously penetrated and torn at at least two, or more, muscle heignt levels.

Referring again to FIG. 1, additional steps are shown for further treatment of the intermediate meat product A. In step 30, two or more pieces of the macerated meat are placed together so that the macerated surface of one piece is in contact with the macerated surface of the other piece. The pieces of meat are then pressed together in a compression mold in step 32. Subsequently the pressed and molded meat is cooked under pressure in step 34, resulting in the cooked meat product B. This pressing and cooking process is disclosed in our U.S. Pat. No. 3,644,125.

The resulting product B represents a great improvement over prior products due to the multi-level maceration method of the present invention. By subjecting two or more levels of muscle tissue to maceration as opposed to the known method of single level maceration, much more myosin, actin and tropomyosin protein is released. As a results, when the macerated surfaces are pressed together and cooked, the released proteins join together to create new muscle tissue between the macerated surfaces of the original muscle tissue, serving to bond the pieces of meat together with a much greater degree of cohesion than was made possible by the known method of single muscle level maceration.

There will also be a much improved distribution and absorption of the curing agents due to the exposure to an increased amount of the meat's surface area.

FIGS. 2-5 are schematic drawings which illustrate one preferred embodiment of the method of the present invention. FIG. 2 shows the meat prior to its entry into the compression zone 40, located just below the multi-level maceration means 42 and where the meat is subjected to compression. The multi-level maceration means 42 as shown in FIGS. 2-5 consists of a plurality of blunt edged radially slotted discs of different diameters. The discs are mounted on a rotating shaft in an alternating pattern so that discs of smaller diameter 44 alternate with the discs of larger diameter 46.

FIG. 3 illustrates the passage of the meat through the compression zone, where it is simultaneously compressed and penetrated by the slotted discs. The smaller discs compress and penetrate one portion of the meat at one level of muscle tissue while the larger discs simultaneously compress and penetrate another portion of the meat at a second muscle tissue level. The blunt edges of the slotted discs engage and penetrate the meat as it enters the compression zone and the rotating action of the discs serves to macerate or tear the meat and continuously feed the meat into and through the compression zone. Specifically, the rotating action of the discs causes the meat to be punctured, ruptured and torn at the points where the blunt edges of the slotted discs have penetrated the muscle tissue, and to be slit along rough serrated lines 45 and 47 generally interconnecting the penetration points (see FIG. 6). The tears in the meat are initiated at the two penetration points 50 and 52 to achieve two levels of penetration 53 and 55 due to the maceration action of the two sizes of discs 44 and 46.

FIG. 4 illustrates the meat as part of it leaves the compression zone and the remaining part is simultaneously compressed, penetrated and torn by the slotted discs 44 and 46 as it is being fed through the compression zone 40. After the meat is expelled from the compression zone it begins to expand to its previous dimensions as seen in FIG. 4.

FIG. 5 illustrates the meat after it has been completely expelled from the compression zone 40. The meat has completely expanded to its original size and the tears extend deep into its interior at two different levels 53 and 55. The macerated meat is now ready for further treatment in the pressing and cooking process.

FIG. 6 illustrates a plan view of the meat's surface after it has been macerated according to the method of the present invention. There are numerous elongated punctures 63 extending deep into the meat and which are interconnected by the slit line 45 and 47. The tears are the result of the rotating action of the blunt edges of the slotted discs as they penetrate and slit the meat.

FIG. 7 is a cross sectional view of the meat taken along the line 7—7 of FIG. 6, and shows the penetrations and tears 64 effected by the smaller slotted discs 44 (as shown in FIGS. 2-5) at the first level of muscle tissue 53 as they penetrate the meat and pull it further into the compression zone. The broken lines illustrate the deeper penetrations and tears, which are not visible in this view, effected by the larger slotted discs 46 (as shown in FIGS. 2-5) at the second level of muscle tissue 55.

FIG. 8, a cross sectional view of the meat taken along the line of 8—8 from FIG. 6 illustrates the deeper penetrations and tears 65 made by the blunt edges of the larger slotted discs 46 as they penetrate and slice the meat at a second muscle height level 55 and pull it further into the compression zone. The broken lines represent the penetrations and tears 64, which are not visible in this view, made by the smaller discs 44 at the first muscle height level 53.

FIG. 9 represents a cross sectional view of the meat taken along the line 9—9 where in the penetrations and tears 64 and 65 at the two muscle height levels are visible.

FIG. 10 is a cross sectional view of two pieces of meat with their macerated surfaces in contact and pressed together. In the pressing of the meat the macerated surfaces generally conform to one another so that the meat surface of one piece moves and conforms into the penetrations and tears of the other piece. As the meat is pressed and molded together and cooked under pressure, the macerated surfaces bond together eliminating gaps, as represented schematically at 66.

The method of the present invention improves the bonding of the meat because the multi-level maceration releases more of the proteins which are responsible for the bonding than known maceration methods, and because bonding takes place at mutiple levels as opposed to a single level of bonding achieved in prior maceration methods. The improved bonding achieved by multi-level maceration results in a denser and more cohesive final meat product. The denser product will cook faster, be more likely to remain in one piece when sliced, have a much more tender bite and be more palatable. Further, the multi-level maceration produces more pliable intermediate meat pieces which conform better in the pressing process thus reducing voids in the meat.

Referring to FIG. 11, one preferred embodiment of the macerating assembly of the present invention comprises a shaft 71 with a plurality of blunt edged radially slotted discs of differing diameters 72 and 73 mounted thereon. The discs of larger diameter 72 alternate with the discs of smaller diameter 73, so that meat passing into contact with the discs is simultaneously macerated at two different muscle height levels. Both sets of discs have blunted radial and peripheral edges so that the meat is ruptured and torn as well as serrated and slit. The shaft 71 includes means 74 for mounting said shaft for rotation.

The present invention contemplates the macerating assembly in combination with various types or assemblies of meat macerating apparatus. Referring to FIG. 12, one embodiment of a macerating unit or assembly 75 is shown in a meat macerating machine comprising an inclined meat-supporting table 76 and a pressure device 77. The meat slides along the inclined table until it passes under the rotating macerating assembly 75 where it is ruptured and torn by the radially slotted discs of two different diameters. The pressure device 77 can be adjusted so as to project the inclined table and the meat upward toward the discs. This allows the machine to accommodate smaller sizes of meat or to achieve a greater degree of compression.

Referring to FIG. 13, there is illustrated two macerating units or assemblies 78 and 79 in a meat macerating machine where the meat passes between two contrarotating shafts 80 and 81 of macerating discs and is simultaneously macerated on two sides at two different muscle height levels.

Referring to FIG. 14, there is illustrated a macerating assembly 82 in a meat macerating machine which consists of a smooth roller 83 mounted on a second rotatable shaft 84 opposite the rotatable shaft 85 with the macerating discs. The meat passes between the contrarotating shafts 84 and 84 and is macerated at two different muscle height levels on one side of the meat while the smooth roller helps to urge the meat through the machine as well as to compress the meat.

The method and apparatus of the present invention provide the commercial meat processor with many useful and unexpected advantages. For instance, the multi-level maceration of meat improves the cohesion and binding of pieces of macerated meat that are pressed together and cooked under pressure, a denser meat product results which cooks or smokes faster, and thus reduces energy usage in the cooking or smoking process. Furthermore, the meat processor can sell his meat product with more confidence as to consumer satisfaction because the multi-level maceration can produce a final meat product which after the bonding and cooking process has the appearance of a single piece of meat, remains in one piece when sliced, and is more palatable.

What is claimed is:

1. A macerating assembly for macerating meat comprising:
   a shaft,
   a plurality of first discs mounted on said shaft,
   a plurality of second discs with a diameter less than the diameter of said first discs mounted on said shaft and spaced between said first discs, said first and second discs having radial slots in their periphery presenting radial and peripheral blunt edges for simultaneously compressing and macerating meat at multiple muscle height levels, said second discs extending radially to a distance such that their peripheral edges are at the deepest point of said slots in said first discs, said second discs thereby serving to simultaneously compress and macerate said meat at a different muscle height level than said second discs.

2. An apparatus for macerating meat comprising:
   a macerating assembly according to claim 1, wherein said shaft is mounted for rotation,
   means for driving said shaft, and
   means for urging the meat toward and into contact with said macerating assembly whereby the meat is macerated.

3. An apparatus for macerating meat according to claim 2, wherein said means for urging the meat toward and into contact with said macerating assembly comprises:
   an inclined meat-supporting table.

4. An apparatus for macerating meat according to claim 3, together with a pressure device for adjusting the upward projection of the meat toward and away from said macerating assembly.

5. An apparatus for macerating meat comprising:
a first macerating assembly according to claim 1 wherein said shaft is mounted for rotation,
a second macerating assembly according to claim 1 wherein said shaft is mounted for rotation contra to the rotation of said first shaft and spaced apart from said first shaft to define a plane therebetween through which pieces of meat pass into contact with said macerating assembly and are macerated, and
means for driving said shafts.

6. An apparatus for macerating meat according to claim 5, wherein one of said shafts is adjustably mounted to vary the distance between said shafts.

7. An apparatus for macerating meat according to claim 5, wherein said means drives the shafts at different relative speeds.

8. An apparatus for macerating meat comprising:
a first macerating assembly according to claim 1 wherei said shaft is mounted for rotation,
a second shaft mounted for rotation contra to the rotation of said first shaft and spaced apart from said first shaft to define a plane therebetween, and
a smooth roller mounted on said second shaft for feeding the meat, compressing the meat and urging the meat into contact with said macerating assembly whereby the meat is macerated.

9. An apparatus for macerating meat according to claim 8, wherein one of said shafts is movably mounted for varying the distance between said shafts.

* * * * *